June 18, 1935.  H. C. WEAVER  2,005,513
SPRING SUSPENSION MECHANISM FOR VEHICLES
Filed April 21, 1934
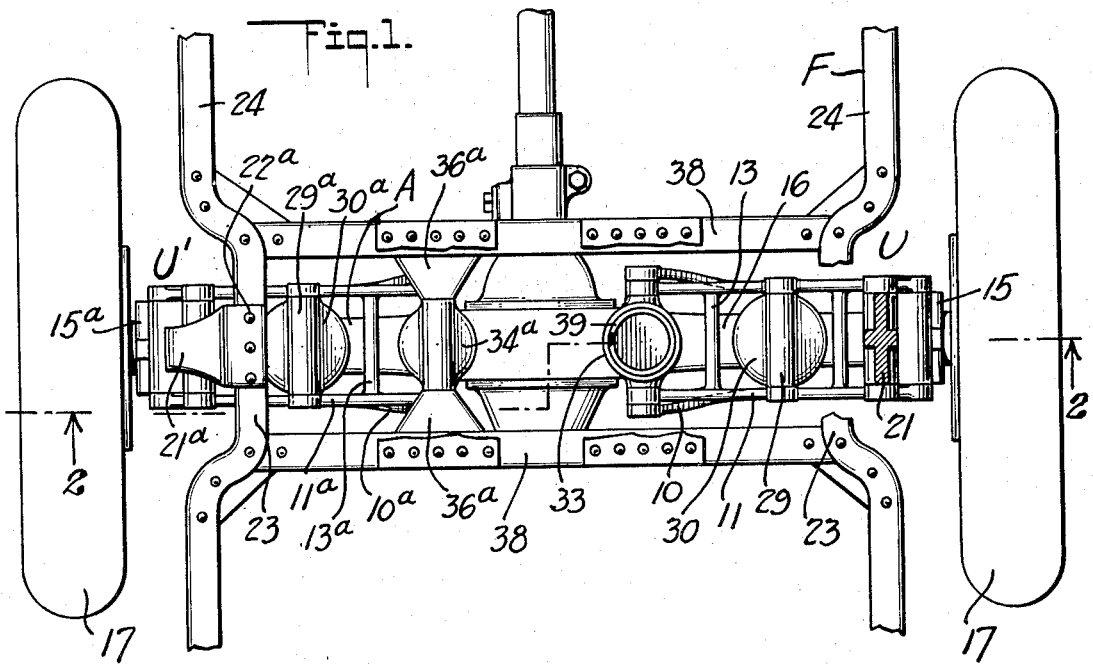
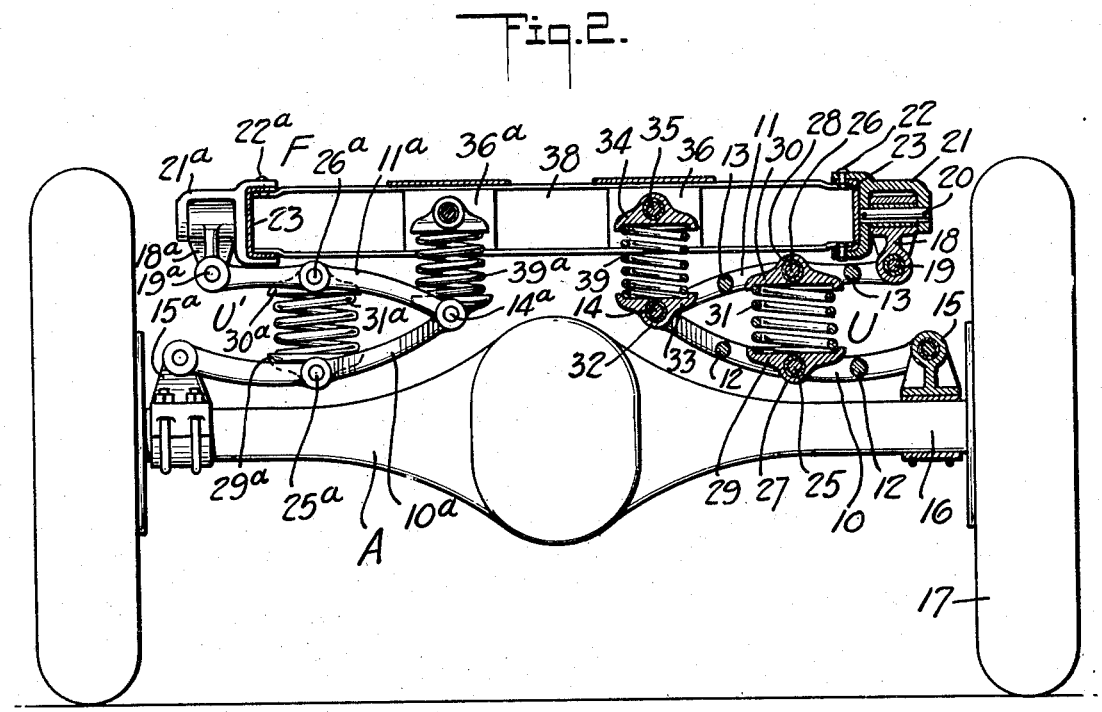
INVENTOR.
HARRY C. WEAVER
BY
Anderson & Liddy
ATTORNEYS.

Patented June 18, 1935

2,005,513

UNITED STATES PATENT OFFICE 2,005,513

SPRING SUSPENSION MECHANISM FOR VEHICLES

Harry C. Weaver, San Gabriel, Calif., assignor of one-half to David Grattan, Los Angeles, Calif.

Application April 21, 1934, Serial No. 721,775

6 Claims. (Cl. 267—20)

This invention relates generally to vehicles and more particularly to mechanisms for spring mounting the bodies of vehicles in order to cushion and absorb road shocks.

An object of this invention is to provide a novel mechanism which in its association with a vehicle, such as an automobile, effectively cushions road shocks in a manner to prevent the transmission of such shocks to the body of the vehicle while maintaining the body substantially level, irrespective of variations in the road surface, as well as tending to eliminate side jolt of the body and to compensate for the action of centrifugal force upon the body when steering other than a straight course, by causing the body to assume a "banked" position rather than be lowered towards the outer side of a turn with the consequent tendency of displacing the occupants laterally on their seats.

Another object of the invention is to provide a novel spring suspension mechanism which can be adapted with equal efficiency to both torque tube and Hotchkiss drive types of running gears.

With these and other objects in view, the invention consists in the novel arrangement and functioning of elements as set forth in the following specification and appended claims.

In the accompanying drawing,

Figure 1 is a plan view partly broken away, and showing one form of spring suspension mechanism embodying this invention;

Figure 2 is a vertical transverse sectional view taken on the line 2—2 of Figure 1.

For the purpose of illustration, the invention is shown associated with the rear axle A of an automobile and comprises two identical spring suspension units U and U' disposed in right and left hand relationship and supporting the chassis frame F to which the usual body (not shown) is adapted to be rigidly secured to form a part thereof, as will be understood.

A detailed description of one of the two units will, therefore, suffice, and to distinguish like parts of the units from each other the numerals designating the parts of one unit will be provided with exponents.

Each unit comprises a pair of levers 10 and 11, the lever 10 being composed of a pair of arms rigidly connected in spaced parallel relation by tie bars 12—12, and the lever 11 being composed of a pair of arms rigidly connected in spaced parallel relation by tie bars 13—13. The arms of the lever 10 diverge relatively at one end and receive a pin 14 which also passes through the arms of the lever 11 so as to pivotally connect the levers at one end.

The free end of the lever 10 is pivotally connected to a bracket 15 pivotally mounted upon the rear axle housing 16 of the vehicle adjacent a wheel 17 of the latter, as clearly shown in Figure 2.

The free and corresponding end of the lever 11 is movably connected to the chassis frame F by a universal connector 18 having pivot pins 19 and 20 disposed at right angles to each other and respectively passing through the arms of the lever and through a U-bracket 21 rigidly secured by rivets 22 to an inwardly offset portion 23 of one of the two longitudinal members 24 of the chassis frame E.

Intermediate their ends, pins 25 and 26 pass through the arms of the respective levers 10 and 11 and through sleeves 27 and 28 disposed diametrically on cup-shaped heads 29 and 30, respectively, between which is interposed a main coil spring 31.

The pin 14 which pivotally connects the levers 10 and 11 passes through the diametric sleeve 32 of a cup-shaped head 33. A co-operating cup-shaped head 34 is pivotally connected by a pin 35 to brackets 36 rigidly secured to spaced apart transverse members 38—38 rigidly connecting the longitudinal members 24 of the frame F at the offset portions 23. An auxiliary and centering spring 39 is interposed between the heads 33 and 34 and is considerably lighter and more flexible than the main spring 31.

The operation of the invention is as follows:

With the two units U and U' arranged as shown in Figure 2, the lever systems of the respective units extend transversely of the chassis and the centering springs 39 and 39a are disposed adjacent to and at opposite sides of the longitudinal center line of the chassis.

Should the wheel 17 strike a bump, for example, the primary shock will be delivered initially to the vertically disposed centering spring 39 which it will be remembered is located near the center line of the floating mass. The centering spring 39 is thus initially compressed by the raising of the wheel to absorb the shock and is aided by the main spring 31 which due to its greater strength is compressed to a lesser extent, causing relative pivotal movement of the levers 10 and 11 towards each other about the pin 14. It will be apparent that the initial compressing of the spring 39 causes movement of the levers 10 and 11 about their pivotal connections with the axle and chassis, so that the effect is to minimize the upward movement of the side of the chassis at the wheel 17 and to tend to eliminate side jolt of the chassis by translating the latter vertically rather than rotatively or tiltingly.

Concurrently with this operation, the springs 31a and 39a of the unit U' co-act with the levers 10a and 11a in supporting the opposite side of the chassis against lowering movement so that the chassis is maintained substantially level. The vehicle is thus very stable, and the jolt resulting from the sudden raising of the wheel is absorbed before reaching the occupants of the vehicle.

Should the wheel 17 drop into a rut or hole, the above described operation with respect to the two units is reversed as the springs 31 and 39 co-act with the levers 10 and 11 of the unit U in supporting that side of the chassis at the wheel 17 while the springs 31a and 39a co-act with the levers 10a and 11a of the unit U' in absorbing the shock so that the chassis will be maintained substantially level and its lowering movement minimized and the chassis translated vertically instead of rotatively or tiltingly.

The mechanism embodying this invention is applicable to both front and rear axles of an automobile, and in a front axle installation permits the use of a rigid axle with the attendant structural safety. In torque tube drive cars, the universal connectors 18 and 18a provide for the arcuate vertical movement of the rear axle assembly, and can be dispensed with on Hotchkiss drive cars by spreading the levers of units to a greater extent at their respective pivotal connections with the chassis.

I claim as my invention:

1. A spring suspension mechanism for vehicles comprising two units, each composed of a pair of pivotally connected levers; means for pivotally connecting free portions of the levers of each unit respectively to the chassis frame and axle of a vehicle, so that the levers will be transversely disposed relatively to the frame, and the pivotally connected portions of the pairs of levers will be arranged in confronting relationship; a main spring for each unit operatively interposed between the levers thereof, to urge the chassis frame and axle away from each other; and an auxiliary spring for each unit operatively interposed between the levers thereof and the chassis frame at the point of connection of said portions with each other to urge the levers and frame relatively away from each other for coaction with the main spring in yieldingly supporting the frame from the axle.

2. A spring suspension mechanism for vehicles comprising two units each composed of a pair of pivotally connected levers; means for pivotally connecting free portions of the levers of each unit respectively to the chassis frame and axle of a vehicle so that the levers will be transversely disposed relative to the frame, and the pivotally connected portions of the pairs of levers will be arranged in confronting relationship; a main spring for each unit interposed between the levers thereof to normally urge the chassis frame and axle relatively away from each other; and a second spring for each unit interposed between the levers thereof and the chassis frame at the point of pivotal connection of the levers with each other to initially yield to road shocks and to co-act with the levers and first spring in translating the chassis frame vertically a minimum distance in response to the road shock.

3. In a spring suspension mechanism for vehicles; a pair of levers pivotally connected together at one end; means for pivotally connecting the opposite ends of the respective levers to the axle and frame of a vehicle to dispose the levers transversely of the frame; a main spring interposed between the levers to urge the latter relatively away from each other about the axis of their pivotal connection in order to provide a yieldable support for the frame from the axle; an auxiliary spring; and means for correlating the auxiliary spring with the frame and with the levers at their pivotal connection to urge the frame and levers away from each other relatively.

4. In a spring suspension mechanism for vehicles, a pair of levers pivotally connected at one end; means for pivotally connecting the opposite ends of the respective levers to the axle and frame of a vehicle to dispose the levers transversely of the frame; a main spring disposed between the levers intermediate the ends thereof to urge the levers relatively away from each other about the axis of their pivotal connection; an auxiliary spring; and means for operatively associating the auxiliary spring with the levers at their pivotal connection and with the frame adjacent the longitudinal center line thereof to urge the frame and levers away from each other relatively.

5. A spring suspension mechanism for vehicles comprising two units each composed of a pair of levers pivotally connected at one end; means for pivotally connecting the opposite ends of the levers of each unit to the chassis frame and axle of a vehicle so that the levers will be disposed transversely of the frame with their pivotally connected ends in confronting relationship; a main spring for each unit disposed intermediate the ends of the respective pairs of levers and correlated therewith to normally urge the chassis frame and axle relatively away from each other; an auxiliary spring for each unit; and means for operatively associating the auxiliary springs with the respective pairs of levers at their pivotal connections and with the chassis frame at opposite sides of the longitudinal center line thereof to yield to road shocks and to coact with the main springs and the lever systems in vertically translating the chassis frame in a lever position in response to the road shocks.

6. A spring suspension mechanism for vehicles comprising a pair of levers pivotally connected together at one end to move vertically relative to each other and provided at their pivotal connection with a tiltable head; a tiltable head adapted to be mounted upon a chassis frame and disposed above the first named head; a coil spring interposed between both heads; a spring interposed between both levers between the ends thereof; means for pivotally connecting the free end of one of the levers to an axle adjacent to the outer end thereof; and a universal connector for attaching the free end of the other lever to a chassis frame at the side thereof.

HARRY C. WEAVER.